United States Patent [19]

Wheeler, Jr.

[11] Patent Number: 4,595,546
[45] Date of Patent: Jun. 17, 1986

[54] MANUFACTURE OF ELONGATED EXTRUDED CROSS-LINKED PRODUCTS

[75] Inventor: John R. Wheeler, Jr., Mystic, Conn.

[73] Assignee: Crompton & Knowles Corporation, New York, N.Y.

[21] Appl. No.: 551,749

[22] Filed: Nov. 14, 1983

[51] Int. Cl.$^4$ .............................................. B29C 47/50
[52] U.S. Cl. ........................................ 264/83; 264/174; 264/236; 264/347; 264/349; 425/71; 425/113; 425/206; 425/207; 425/208; 425/376 B; 523/324; 523/326; 523/348; 525/106; 528/901
[58] Field of Search ................ 264/83, 174, 236, 347, 264/349; 425/71, 113, 206, 207, 376 B, 208, 209; 525/106; 523/324, 326, 348; 528/901

[56] References Cited

U.S. PATENT DOCUMENTS

| | | | |
|---|---|---|---|
| 3,646,155 | 2/1972 | Scott | 260/827 |
| 3,785,620 | 1/1974 | Huber | 259/4 |
| 3,817,675 | 6/1974 | Maiocco | 425/376 R |
| 3,871,624 | 3/1975 | Huber et al. | 259/4 |
| 3,979,488 | 9/1976 | Greenhalgh et al. | 264/176 R |
| 4,107,354 | 8/1978 | Wilkenloh et al. | 264/174 |
| 4,117,063 | 9/1978 | Voight et al. | 264/174 |
| 4,117,195 | 9/1978 | Swarbrick et al. | 264/174 |
| 4,234,531 | 11/1980 | Jocteur | 264/174 |
| 4,250,132 | 2/1981 | Beach | 264/174 |
| 4,302,409 | 11/1981 | Miller et al. | 264/45.9 |
| 4,333,898 | 6/1982 | Schmidtchen | 264/45.9 |
| 4,341,474 | 7/1982 | Wheeler et al. | 366/88 |
| 4,351,790 | 9/1982 | Hochstrasser et al. | 264/236 |
| 4,409,164 | 10/1983 | Brasz et al. | 264/50 |
| 4,419,014 | 12/1983 | Gale | 366/99 |
| 4,489,029 | 12/1984 | Keogh et al. | 264/83 |

FOREIGN PATENT DOCUMENTS

| | | | |
|---|---|---|---|
| 2265524 | 11/1975 | France | 425/207 |
| 2315156 | 2/1977 | France | 425/113 |
| 52-60875 | 5/1977 | Japan | 264/236 |
| 53-120770 | 10/1978 | Japan | 264/236 |
| 54-139968 | 10/1979 | Japan | 264/349 |
| 55-82628 | 6/1980 | Japan | 264/236 |
| 55-135641 | 10/1980 | Japan | 264/236 |
| 58-142834 | 8/1983 | Japan | 264/236 |
| 930339 | 7/1963 | United Kingdom . | |

OTHER PUBLICATIONS

"RAPRA's Glittering Prize" Gale et al., *European Rubber Journal*, 7–1982, pp. 29–32.
"Applications of the Cavity Transfer Mixer to Rubber Extrusion", Hindmarch et al., *Elastomerics*, 8–1982, pp. 20–25.

*Primary Examiner*—Jeffery Thurlow

[57] ABSTRACT

A method for the manufacture of a cross-linked extruded elongated product from polyethylene or other suitable polymer. The polymer is fed into the hopper of a screw extrusion machine. The polymer is heated and melted while being conveyed through the barrel of the screw extruder. A liquid silane compound which comprises a modified vinyl functional silane, a free-radical generator, and a condensation catalyst is carefully metered and injected into the melted polymer. The melted polymer and the liquid silane compound are then mixed and blended to obtain a uniform blended mixture thereof. The blended mixture is then extruded through an extrusion die to form an elongated product of a required final shape and the elongated product is then subjected to the action of moisture and heat until the polymer in the elongated product is cross-linked.

5 Claims, 4 Drawing Figures

MANUFACTURE OF ELONGATED EXTRUDED CROSS-LINKED PRODUCTS

BACKGROUND OF THE INVENTION

This invention relates to the manufacture of extruded elongated products, especially but not exclusively, electric cables and pipes, that are of carbon chain polymers cross-linked by the use of hydrolysable unsaturated silane. In the past such products have been formed by first reacting the polymer with the hydrolysable unsaturated silane in the presence of a free-radical generator such as a peroxide and afterwards exposing the grafted material to the effects of moisture and heat and a silanol condensation catalyst. Suitable reagents for this process have been described in U.S. Pat. No. 3,646,155 which issued on Feb. 29, 1972. Since the issuance of that patent it has become known that this process is applicable to a variety of polymers other than polyethylene and the modified polyethylenes referred to in that specification. Examples of such other polymers are chlorinated polyethylene and a wide range of olefin copolymers which can be processed and in the practice of the present invention the reaction conditions set forth in the above identified U.S. patent need not in all cases be strictly adhered to. In the process of the above identified patent the polyethylene is mixed with an organic silicon derivative in the presence of an anti-oxidant and a peroxide chemical interaction occurs upon that mixture. The purpose of this operation is to "graft" a free silane radical onto the linear polyethylene chain. This grafting process takes place whenever the polyethylene and the organic silicon derivative comes into contact but the product must be dried before it is mixed with an appropriate catalyst which must be stored separately. Thereafter the cross-linked graft co-polymer is mixed with the catalyst and the resulting product is extruded onto a cable or into a suitable elongated product.

The extruded product is subsequently cross-linked by immersion in hot water or saturated steam and the operation can take several hours depending upon the thickness of the insulation and the temperature of the water or steam.

An improvement on the above identified process is disclosed in U.S. Pat. No. 4,117,195 issued on Sept. 26, 1978 to Peter-Swarbrick et al. In this process the grafting and the mixing states are combined into a single operation and the preliminary agranulation step is eliminated. In this process polyethylene or another suitable polymer which is capable of being cross-linked by the use of a hydrolysable unsaturated silane is metered into a screw extrusion machine together with the compounding ingredients which comprise a hydrolysable unsaturated silane, a free-radical generator and a silanol condensation catalyst. All of these ingredients are blended with the polymer in the barrel of the extruder and then the temperature of the mixture is raised sufficiently to effect grafting of the silane groups to the polymer. The mixture is then melted and extruded from the extruder through an extrusion die to form an elongated shaped product. This product is then cross-linked by the action of moisture.

While the method of U.S. Pat. No. 4,117,195 is an improvement over the method of U.S. Pat. No. 3,646,155, it still has a number of disadvantages. For example, this process requires a very expensive screw extrusion machine which has a very long barrel to give the material time to mix, melt, homogenize, and graft within the barrel of the extruder. For example, this process requires an extruder which has a length to diameter ratio of 28 or 30 to 1 in order to produce a melted, blended polymer ready for extrusion and for cross-linking. It is believed that one reason for this is that the heating is very erratic where the liquid is injected with the solid particles into the barrel or the hopper before the polymer is heated. Thus it is believed that uneven grafting takes place before the polymer begins to melt or is melted to any substantial degree.

In addition to the drawbacks noted before, the process of U.S. Pat. No. 4,117,195 also requires very expensive dosimetry equipment for each ingredient fed into the hopper of the extruder since the polymer and each of the compounding ingredients must be carefully metered into the extruder so as to provide the proper ratio of compounding ingredients and the polymer.

Additional drawbacks to the prior art process is the requirement that the manufacturer utilizing this process is required to purchase, store and handle a multiplicity of ingredients.

SUMMARY OF THE INVENTION

The present invention overcomes the shortcomings of the prior art as discussed above in the background. In accordance with this invention a method of making a cross-linked elongated extruded product comprises the steps of metering into the hopper of a screw extruder, a polymer such as polyethylene, but not limited thereto. All of the polymers disclosed in U.S. Pat. No. 3,646,155, and U.S. Pat. No. 4,117,195 can be used in the present process. The polymer is fed into the hopper usually in pellet form but could be in powder form as well. In any event, the polymer, after being fed into the extruder, is conveyed by the screw of the extruder through the barrel of the extruder. At the same time the polymer is heated and melted until all or substantially all of the polymer is melted. After the polymer is melted a liquid silane compound sold by Union Carbide of Danbury, Conn., under the trademark SILCAT R, is injected into the melted polymer. This compound will be described in greater detail hereinafter. The melted polymer and the liquid silane compound are forced by the screw of the extruder into a mixing and blending section which may be a part of the extruder or an extension thereof. The melted polymer and the liquid silane compound are uniformly mixed and blended immediately after the liquid silane compound is injected into the melted polymer. The blended mixture of polymer and the silane compound is then forced through an extrusion die to form an elongated product of a required final shape. Thereafter the elongated product is subjected to the action of moisture and heat as in U.S. Pat. Nos. 4,117,195 and 3,646,155 as noted above. This produces a cross-linking of the polymer in the elongated product.

By using the method outlined herein, the extruder used to carry out this method needs to have a length to diameter ratio of only 20 to 1 in order to produce the melted, blended polymer ready for extrusion and cross-linking. This is to be contrasted with the process in U.S. Pat. No. 4,117,195 which requires a much larger length to diameter ratio as set forth above.

The liquid silane compound is manufactured and sold by Union Carbide of Danbury, Conn. under the trade name SILCAT R and it is described by the manufacturer as a modified vinyl functional silane containing peroxide and condensation catalysts. This product has the following physical properties as described by the manufacturer:

| | |
|---|---|
| Physical form | Clear liquid |
| Boiling Point (760 mm Hg) | 120° C. (248° F.) |
| Flash Point (Open cup ASTM D-29) | 31° C. (88° F.) |
| Autoignition temp. (ASTM D-268 - 58 T) | 206° C. (403° F.) |
| Specific Gravity (25° C./25° C.) | 0.970–0.974 |
| Viscosity at 20° C. | 0.8 cS |
| Colour (Gardner) | 1 |

According to the manufacturer SILCAT R should be stored in a closed container hermatically sealed to exclude moisture and when pumping SILCAT R out of the drum care should be taken not to introduce moist air into the container. To avoid moisture contamination the manufacturer recommends that a drying tube or a nitrogen blanket be used. The manufacturer further recommends that SILCAT R be handled in a well-ventilated area and kept away from sparks or open fire and that due to its latent reactivity that it not be stored at temperatures higher than 40° Centigrade.

The manufacturer of this compound recommends its use in the process of U.S. Pat. No. 4,117,195. Therefore it is assumed that the functional ingredients of this compound are the same as those disclosed in U.S. Pat. No. 4,117,195.

BRIEF DESCRIPTION OF THE DRAWINGS

While this application concludes with claims particularly pointing out and distinctly claiming the subject matter regarded as the invention it is believed that the invention will be better understood from the following description taken in connection with the accompanying drawings in which:

DETAILED DESCRIPTION OF THE INVENTION

Figure 1:
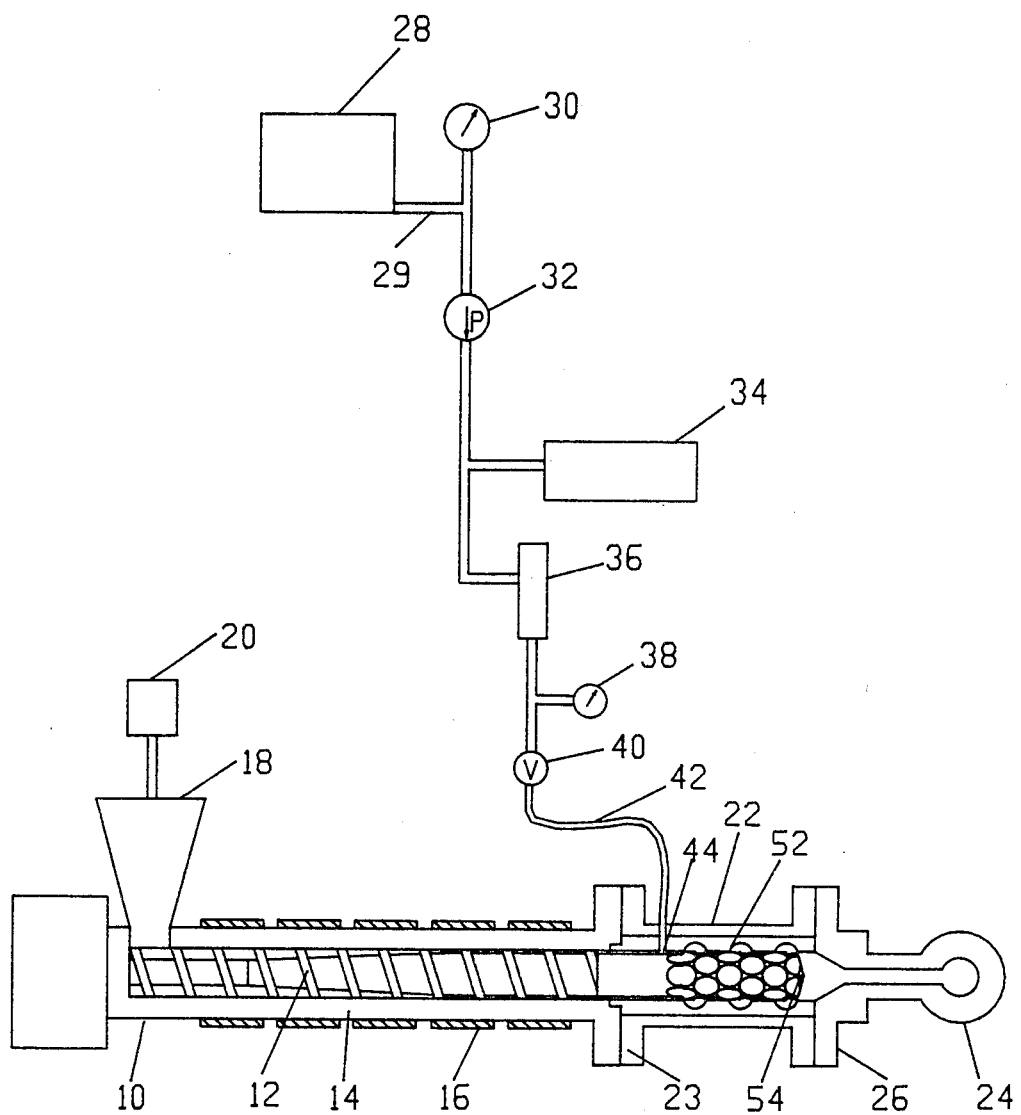
FIG. 1 is a front elevation partially in section of a system of apparatus designed to carry out the process of the invention.

In FIG. 1 there is shown the overall apparatus or system for carrying out the process of the invention. In this drawing the extruder 10 comprises a screw 12 which is mounted for rotation within a barrel 14 for conveying polymer from the hopper 18 through the extruder barrel. It should be noted that the screw 12 as shown is a barrier screw such as that shown in U.S. Pat. No. 4,341,474. However, the extruder screw does not have to be of the barrier type for this invention.

Disposed about barrel 14 are a series of heaters 16 so as to provide the necessary heat to melt the polymer being transported through the barrel. This system is also provided with a hopper feeder designed to supply polymer in pellet form generally but sometimes in powder form as well. The details of the hopper feeder do not constitute a part of this invention and are well known in the art and need not be described in greater detail herein.

As shown in FIG. 1 the barrel 14 is provided at its outlet end with flanges 23 to which are bolted a cavity transfer mixing device 22. The rotor 54 of this device (as shown in FIG. 1) is drivingly connected to screw 12 so as to rotate therewith. However, as will be noted hereinafter, this driving relationship is not necessary to the invention. Rotor 54 rotates within a housing or stator 52 and functions to mix polymer delivered to it by the screw. During the operation of the extruder, polymer fed into hopper 18 in pellet form, is fully melted by the time it reaches the end of the flight of the screw.

The system of the invention also provides means for injecting the liquid silane compound into the melted polymer before the melted polymer is delivered into the cavity transfer mixer. This mechanism comprises a reservoir 28 which is supplied with the liquid silane compound. The liquid silane compound is delivered by a line 29 to an injection port 44 in the housing or stator 52 just before the polymer enters the cavity transfer mixer section. The liquid silane compound supply system also comprises a suction gauge 30 for measuring the suction inlet pressure of a diaphragm metering pump 32 which pumps the liquid silane compound from reservoir 28 to injection port 44. Disposed within the line after the pump 32 is an accumulator 34 which functions to accumulate the excess liquid silane compound pumped by pump 32 and to supply such excess during the pulsing operation of pump 32. That is, accumulator 34 serves to smooth out the pulsing pumping action of pump 32 so as to supply a constant predetermined flow of the liquid silane compound.

Following the accumulator is a flow transducer 36 which measures the flow rate of the liquid silane compound and an injection pressure gauge 38 which measures the pressure of the silane compound flowing through line 29. Downstream from the injection pressure gauge is a cut-off valve 40 which is adapted to be manually turned off during periods of inoperation.

The liquid silane compound drawn from reservoir 28 traverses line 29 and through valve 40 and a flexible hose 42 to the injection port 44. Injection port 44 is provided with a check valve that permits the liquid silane compound to flow only into the interior of the cavity transfer mixing housing or stator. This is necessary to prevent the melted polymer from flowing into flexible hose 42 and line 29.

Figure 2:
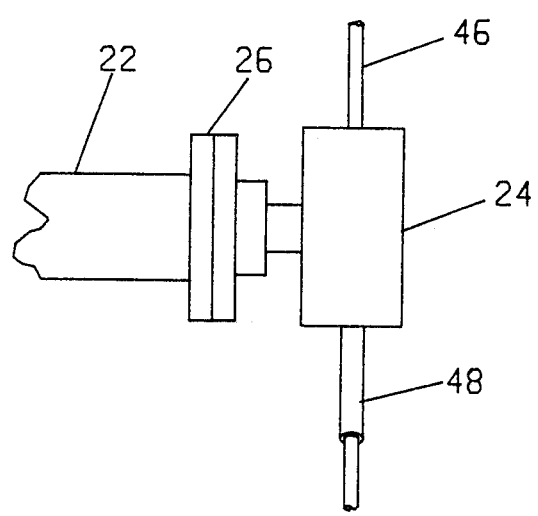
FIG. 2 is a plan view of a portion of the system shown in FIG. 1 taking along line 2—2 of FIG. 1.

As seen in FIG. 2, the polymer is extruded from the cavity transfer mixer 22 into a crosshead die 24 which is bolted to flanges 26 of the cavity transfer mixer. A cable 46 is fed through the crosshead and during its passage through the crosshead is supplied with a sheath or coating 48 of the polymer.

The operation of the device of FIG. 1 will now be described. Suitable polymer is supplied to hopper 18 by hopper feeder 20. This polymer as noted above will be in powder or pellet form. The screw 12 is rotated by drive means not shown to transport the polymer along the length of barrel 14. As the polymer is transported along barrel 14, heat is supplied by heaters 16 to melt the polymer so that the polymer is fully melted by the time it reaches the end of the flight of the screw or flanges 23. The liquid silane compound is inserted through injection port 44 into the melted polymer and the mixture of polymer and the liquid silane compound is then forced into the cavity transfer mixer 22. The mixture of the liquid silane compound and the polymer is evenly blended during its passage through the cavity transfer mixer. In crosshead 24 the polymer and liquid silane compound mixture is shaped to form a layer of insulation 48 about a cable 46 passing through the crosshead with the polymer by a suitable die which is a part of the crosshead and which determines the thickness of the polymer applied to the cable.

Figure 3:
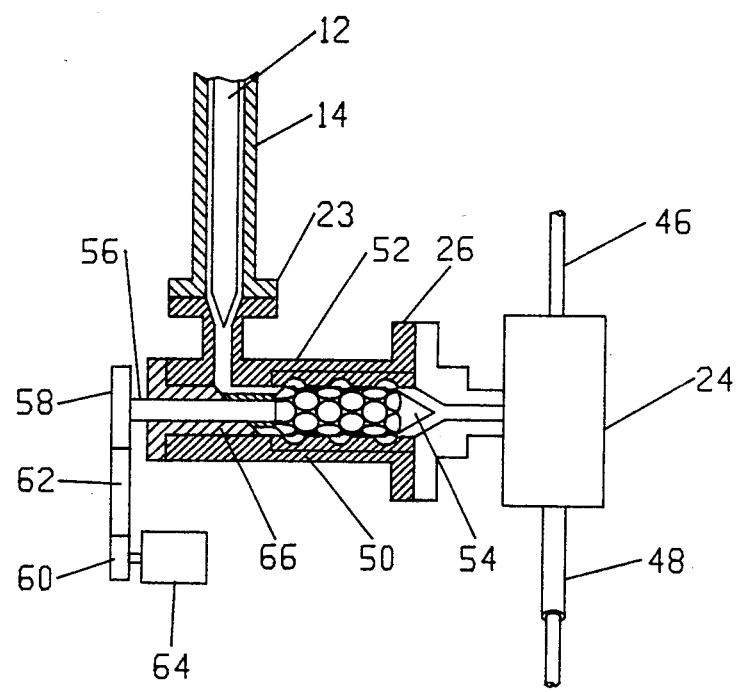
FIG. 3 is a partial view of an alternative system for carrying out the process.

FIG. 3 illustrates an alternative arrangement of the cavity transfer mixer in connection with the extruder barrel. FIG. 3 is a plan view of the alternative arrangement and comprises a cavity transfer mixer 50 whose longitudinal axis extends at right angles to the longitudinal axis of the extruder screw 2. However, this angle is not critical to the operation of the mechanism. In this embodiment the rotor 54 is mounted on a rotor shaft 56 which is provided with a pulley 58 on the end of it. Pulley 58 is driven by motor 64 through pulley 60 and belt 62. With this arrangement it is possible to drive the rotor of the cavity transfer mixer at a different rate than the rotational speed of the extruder screw 12, to provide for better controlled optimized mixing of the polymer and the liquid silane compound. The liquid silane compound injection port is not seen in FIG. 3 since FIG. 3 is a plan view in partial section. However, the injection port injects the silane compound into the cavity transfer mixer adjacent to flange 23 and after the end of extruder screw 12. The combined melted polymer and liquid silane compound is distributed into the cavity transfer mixer by flow distributor 66. The liquid silane compound and the melted polymer are then blended and mixed in the cavity transfer mixer and then forced into crosshead 24 as described in FIGS. 1 and 2.

Figure 4:
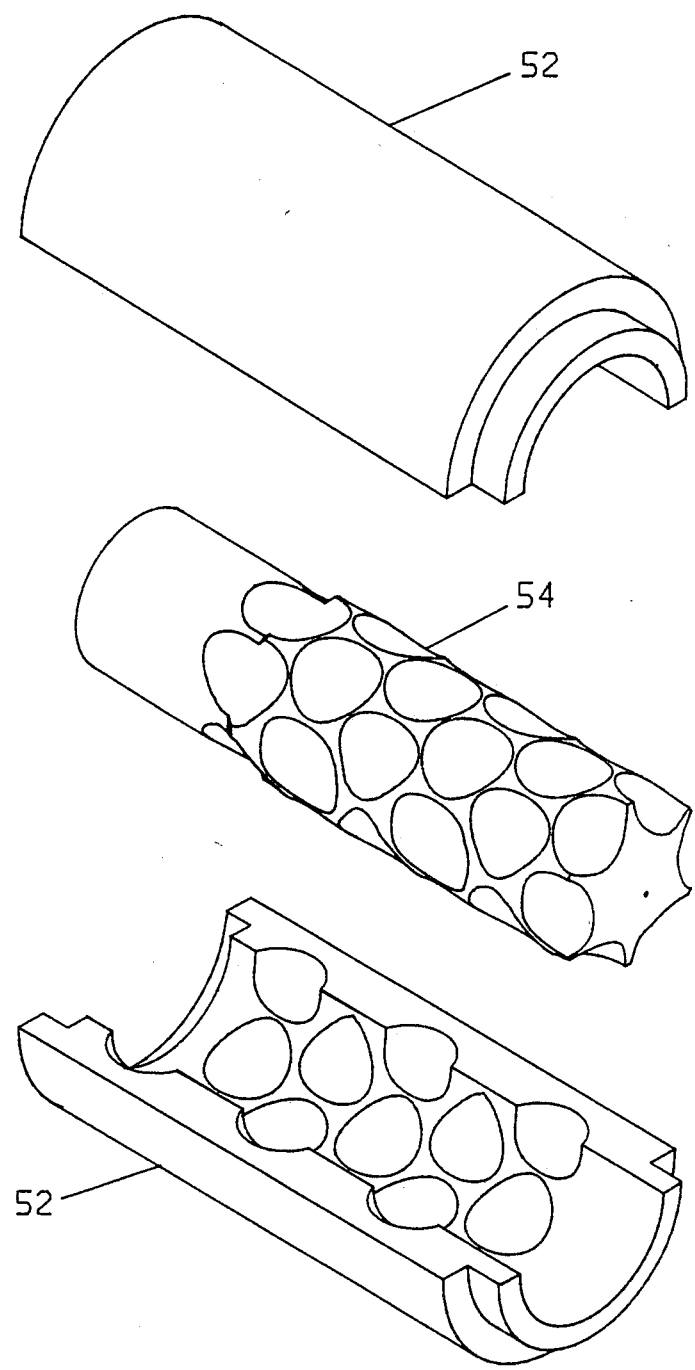
FIG. 4 is an exploded perspective view of the mixing and blending section of the system.

FIG. 4 is an exploded view of the cavity transfer mixing device shown in perspective. There stator 52 comprises two clam shelled sections which when bolted together surrounds rotor 54. Both the stator and the rotor have a series of concave depressions which cooperate to assure complete mixing of the polymer and the silane compound. Details of this mixer form no part of this invention. Details of the cavity transfer mixer are contained in U.S. Pat. No. 4,419,041 issued Dec. 6, 1983 and this device is also described in the July/August 1982 issue of the European Rubber Journal in an article by G. M. Gale and R. S. Hindmarch titled "RAPRA's Glittering Prize". This device is further described in an article in the August 1982 issue of Elastomerics titled "Applications of the Cavity Transfer Mixer to Rubber Extrusion" by R. S. Hindmarch and G. M. Gale.

Instead of the rotary cavity transfer mixer as described above, the system of the invention can also utilize a static mixer of the type disclosed in U.S. Pat. No. 3,871,624 which was issued Mar. 18, 1975 to Max Huber et al or that disclosed and described in U.S. Pat. No. 3,785,620 which was issued Jan. 15, 1974 to Max Huber. Static mixers of this type can also perform the mixing operation of the invention but the rotary cavity transfer mixer is preferred.

While the exact amount of the liquid silane compound necessary to cross-link the polymer will vary from one polymer to another and from the degree of cross-linking desired, it is proposed that one combination would be for each 200 pounds of polymer that 3.30 pounds of the liquid silane compound be used or that the liquid silane compound be present in the mixture 1.62% by weight.

I claim:

1. The method of making a cross-linked extruded elongated product comprising:
   (a) metering into the hopper of a screw extruder which has a barrel and a screw extending from end to end of the barrel, a polymer capable of being cross-linked by the use of a liquid silane compound which comprises a modified vinyl functional silane, a free-radical generator, and a condensation catalyst;
   (b) conveying the polymer through the barrel of the extruder;
   (c) heating and melting while conveying the polymer through the barrel of the screw extruder;
   (d) metering and injecting a liquid silane compound comprising a modified vinyl functional silane, a free-radical generator, and a condensation catalyst into the melted polymer;
   (e) mixing and blending said silane compound and said melted polymer to obtain a uniform blended mixture thereof;
   (f) extruding said blended mixture through an extrusion die to form an elongated product of a required final shape; and
   (g) subjecting said elongated product to the action of moisture until said polymer is cross-linked.

2. The method of making a cross-linked extruded elongated product set forth in claim 1 wherein the polymer is fed in to the hopper of the extruder in pellet form.

3. The method of making a cross-linked extruded elongated product set forth in claim 1 wherein the polymer is conveyed through said extruder by a screw having a solids channel and a melt channel separated by a barrier flight wherein the polymer is collected into the melt channel as it melts during its transportation through the extruder barrel.

4. The method of making a cross-linked extruded elongated product set forth in claim 1 wherein the liquid silane compound is injected into the polymer after substantially all of said polymer is melted.

5. The method of making a cross-linked extruded elongated product as set forth in any one of claims 1 through 4 wherein the liquid silane compound and the polymer are mixed and blended in a rotary cavity transfer mixer before said mixture is extruded.

* * * * *